US007900145B2

(12) United States Patent
Blinnikka

(10) Patent No.: US 7,900,145 B2
(45) Date of Patent: Mar. 1, 2011

(54) SYSTEM AND METHOD FOR SYNCHRONIZING DATA

(75) Inventor: Tomi Blinnikka, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 966 days.

(21) Appl. No.: 11/557,720

(22) Filed: Nov. 8, 2006

(65) Prior Publication Data

US 2008/0126387 A1 May 29, 2008

(51) Int. Cl.
G06F 3/00 (2006.01)
G06F 3/14 (2006.01)

(52) U.S. Cl. .................. 715/719; 715/765; 715/716; 715/205; 345/173

(58) Field of Classification Search .................. 715/716, 715/719, 723, 764, 765, 781, 835, 846; 345/156, 345/157, 163, 173, 179
See application file for complete search history.

(56) References Cited

U.S. PATENT DOCUMENTS

| 6,076,104 | A  | * | 6/2000  | McCue ......................... 709/219 |
| 6,529,920 | B1 | * | 3/2003  | Arons et al. .................. 715/268 |
| 6,771,283 | B2 | * | 8/2004  | Carro .......................... 715/702 |
| 2002/0054116 | A1 | * | 5/2002  | Pavley et al. ................. 345/765 |
| 2002/0190965 | A1 | * | 12/2002 | Lemon ......................... 345/179 |
| 2005/0040939 | A1 | * | 2/2005  | Jobes et al. .................. 340/438 |
| 2005/0251731 | A1 | * | 11/2005 | Valderas et al. .............. 715/500 |
| 2006/0259375 | A1 | * | 11/2006 | Deguchi ....................... 705/27  |
| 2008/0141130 | A1 | * | 6/2008  | Moore et al. ................. 715/714 |

* cited by examiner

Primary Examiner—X. L Bautista
(74) Attorney, Agent, or Firm—James J. DeCarlo; Greenberg Traurig, LLP

(57) ABSTRACT

Systems and methods are disclosed for presenting a media stream to user next adjacent to text and other content via a graphical user interface. The graphical user interface allows allowing the user to select part of the content and associate it with a specified portion of the media stream. The a graphical user interface that displays and renders a media stream, such as a video stream, to a user in a first display area. Near the first display area is a second display area displaying content, such as text, to be associated with some portion of the media stream. The interface allows a user to select some of the content in the second display area with a pointing device. The selection also identifies a portion of the media stream based on what is being rendered as the selection is made and how the selection is made.

46 Claims, 6 Drawing Sheets

SYSTEM AND METHOD FOR SYNCHRONIZING DATA

COPYRIGHT NOTICE

A portion of the disclosure of this patent document contains material which is subject to copyright protection. The copyright owner has no objection to the facsimile reproduction by any-one of the patent document or the patent disclosure, as it appears in the Patent and Trademark Office patent file or records, but otherwise reserves all copyright rights whatsoever.

BACKGROUND

Various computing methodologies exist or have been proposed for easily tagging or otherwise marking different portions of media streams with metadata. Such methodologies will allow a user to create and associate data (referred to as metadata) to the renderable data of a preexisting media stream. For example, specific text (or other data) may be tagged to a specific portion of a video stream so that, when the stream is played back (i.e., rendered) by a suitable media player, the text is displayed by the media player during the specified portion of the video stream.

Different methodologies have been proposed that generally include creating metadata with the tagging information and then associating the data with the media stream data in some way. The term tagging will be used herein to broadly refer to associating a first set of data (metadata) with media stream data. In one proposed method, a new file containing the media stream's data and the metadata is created so that the media stream data is not edited or changed. In another method, a separate file of metadata is created that is then associated with the media file so that both are utilized upon playback. Other methodologies have also been proposed. Such methodologies are useful in creating close captioned video streams and generally in adding data to be displayed with pre-existing media streams.

Currently, however, user interfaces for such tagging methodologies are still the complicated user interfaces that have been developed for audio and video remixing systems. Because remixing systems typically combine the text or other data to be displayed with the actual data of the media stream to create a combined media stream with little or no metadata.

SUMMARY

Against this backdrop systems and methods have been developed for presenting a media stream to user next to text and other content in an interface allowing the user to select part of the content and easily associate it with a specified portion of the media stream. The system includes a graphical user interface that displays and renders a media stream, such as a video stream, to a user in a first display area. Near the first display area is a second display area displaying content, such as text, to be associated with some portion of the media stream. The interface allows a user to select some of the content in the second display area with a pointing device. The selection also identifies a portion of the media stream based on what is being rendered as the selection is made and how the selection is made.

In one aspect the invention may be considered as a method for associating text elements with different a portion of a video stream. The method includes rendering the video stream to a user in a video display area and simultaneously displaying one or more text elements to the user in a touch-sensitive text display area. The method further includes detecting a first touch at a first location on the touch-sensitive text display area as a portion of the video stream is being rendered. In addition the method includes selecting at least one text element in the text display area based on the first location of the touch and associating, in response to the touch, the selected at least one text element with the portion of the video stream.

In yet another aspect, a method is disclosed for associating text elements to be selectively displayed with different portions of a media stream. The method includes rendering the media stream to a user and simultaneously displaying one or more text elements to the user in a text display area. The method further includes receiving a user input as a portion of the media stream is being rendered, the user input selecting at least one text element in the text display area. The method further associates, in response to the user input, the selected at least one text element with the portion of the video stream.

In yet another aspect, a graphical user interface (GUI) is disclosed which includes a first media display area in which a selected media stream is rendered over time. The GUI also includes a second media display area rendering one or more data elements to be associated with different portions of the media stream. In addition, the GUI includes a user-controlled selector allowing a user to select and associate at least one data element in the second display area with a currently displayed portion of the selected media stream in the first media display area.

In yet another aspect, a computer-readable medium encoding computer-executable instructions for performing a method for associating displayable elements to be selectively and concurrently displayed with different portions of a video stream is disclosed. That method includes rendering the video stream to a user and simultaneously displaying one or more displayable elements to the user in a display area. In addition, the method includes receiving a user input as a portion of the video stream is being rendered, the user input selecting at least one displayable element in the display area. The method also includes associating, in response to the user input, the selected at least one displayable element with the portion of the video stream.

These and various other features as well as advantages will be apparent from a reading of the following detailed description and a review of the associated drawings. Additional features are set forth in the description which follows, and in part will be apparent from the description, or may be learned by practice of the described embodiments. The benefits and features will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The following drawing figures, which form a part of this application, are illustrative of embodiments systems and methods described below and are not meant to limit the scope of the invention in any manner, which scope shall be based on the claims appended hereto.

DETAILED DESCRIPTION

Embodiments of systems and methods for associating previously created content, such as text, images or audio, to a previously created renderable media stream are disclosed below. The content is, or is represented by, displayable content that can be visually presented to a user in a display area on a display device such as a computer monitor, touch screen, or other type of display. Displayable content is usually textual, but can an icon, symbol or image. Content and its associated displayable content may be the same, as in the case where the content is text or an image. If the content is not readily displayable, an icon, symbol or other representative displayable element may be displayed in the display area instead. The displayable content may be indicative or representative of any type of content (text, images, audio for video etc) that can be associated with a renderable media stream.

Renderable media streams, as discussed above, refer to data that when rendered create an user perceivable stream of information such as an audio-only stream, a video-only stream, a sequence of visual images, a combined audio-video stream, an animation or a some combination of these. Media streams may be stored as media files or may be received as a transmission of streaming data. Media streams may also be generated in real time. The embodiments described below may be adapted for use with any type of media stream, regardless of how the stream is generated or maintained.

For example, in an embodiment the content and displayable content is a previously created transcript of a renderable audio-video stream in which it is desired to display the transcript as the closed caption for the stream. As another example, an embodiment may be used to create timed karaoke lyrics that have timing information for each word or even syllable for a specific song. In this example, the lyrics are both the displayable content and the content to be associated with different portions of the audio stream of the song. In an embodiment, images may also be associated with different portions of the song, with the displayable content being represented by the image itself or by an icon.

Figure 1:
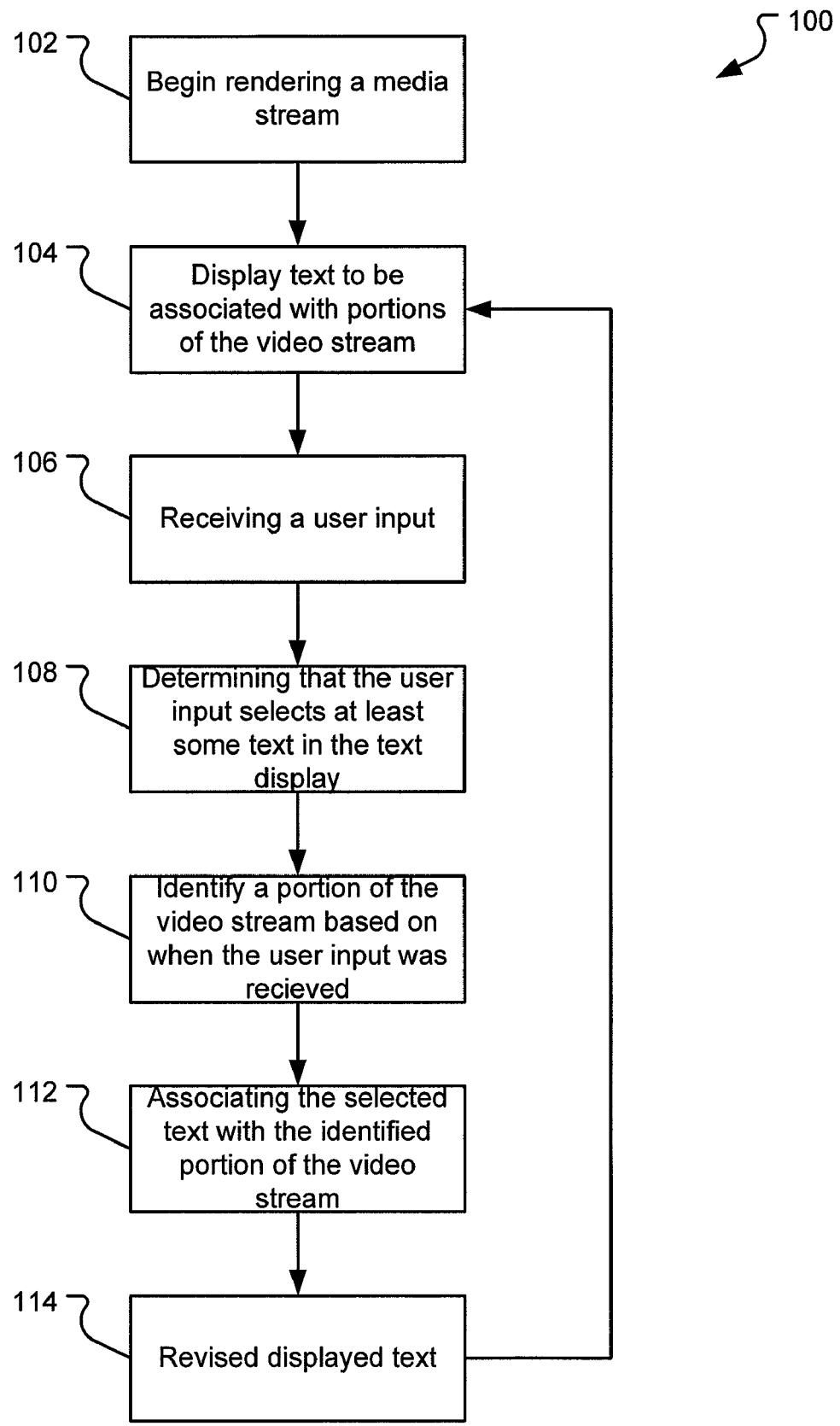
FIG. 1 illustrates an embodiment of a high-level method for associating displayable content with renderable media stream.

FIG. 1 illustrates an embodiment of a high-level method for associating displayable content with renderable media stream. In the embodiment shown, the displayable content will be described as text (e.g., text of a transcript, lyrics, etc.) for the purposes of illustration, but the reader will understand that the method works for any displayable content as described above. In the embodiment shown, the media stream may be maintained in the form a renderable media file (such as an .AVI, MPEG, .MOV, .WAV, .MP3 or other file type) or may be received as a stream of renderable data. Similarly, the displayable content may be obtained from a pre-existing data sources such as one or more text files, image files, audio files, video files, etc. The user may be required to select the media stream and the displayable content (e.g., by choosing the appropriate files) which are then accessed by the system to obtain the data prior to initiating the operations described below. Means and methods for selecting files and/or data sources for accessing by a computer program is well known in the art and need not be described in detail here.

Figure 3:
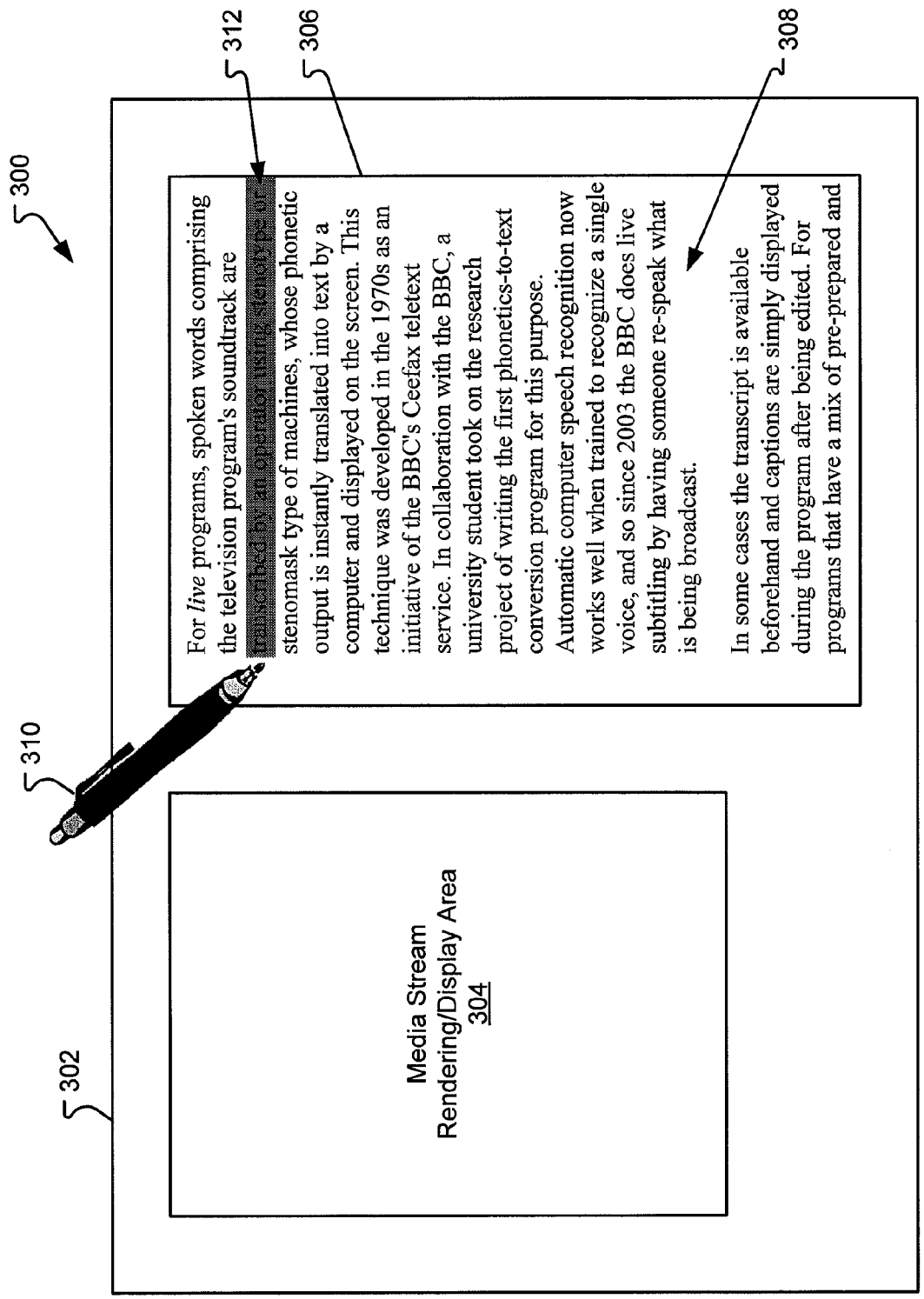
FIG. 3 illustrates a graphical user interface for a system for associating displayable content with renderable media stream.
Figure 4:
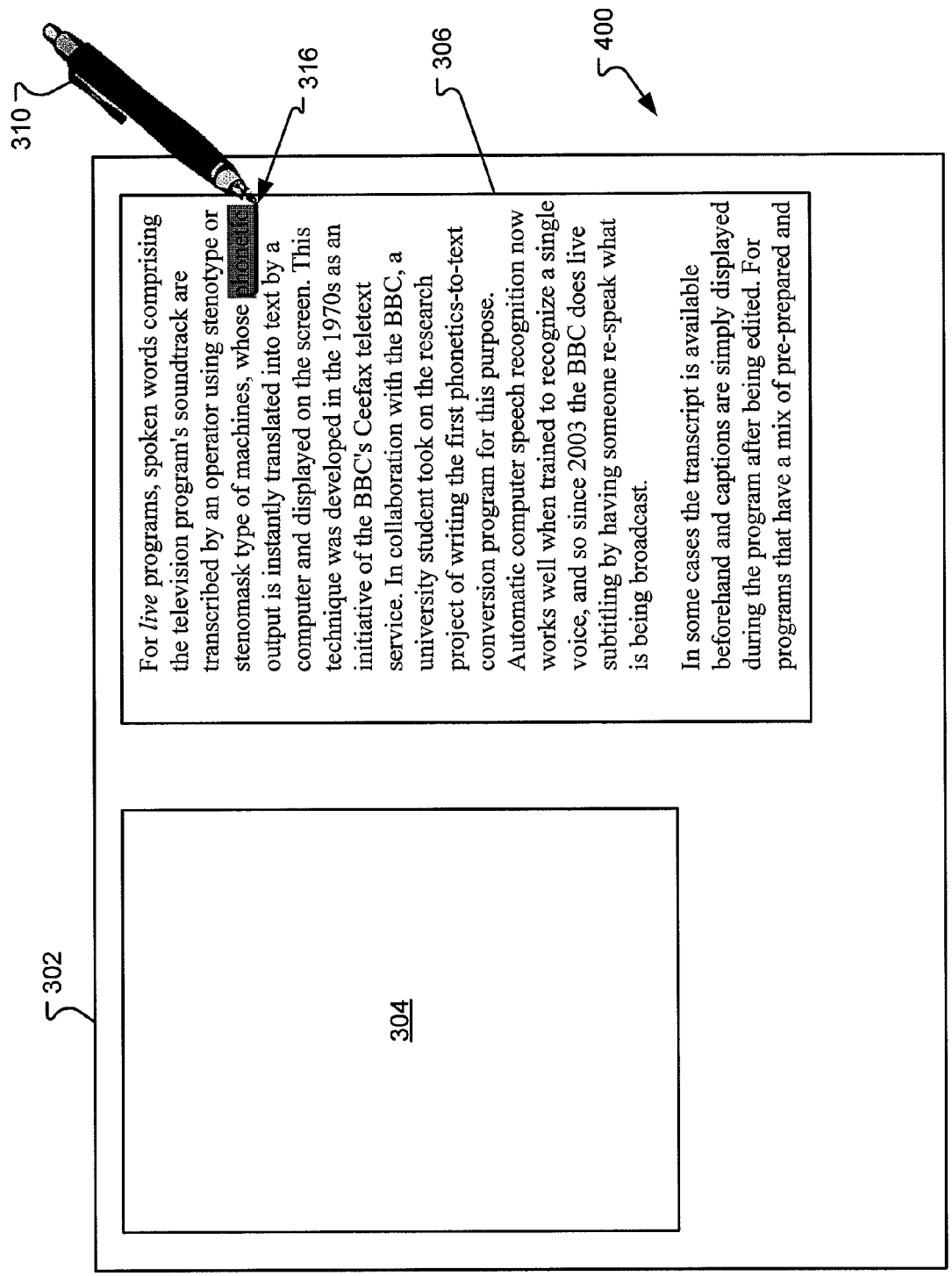
FIG. 4 illustrates a graphical user interface for a system for associating displayable content with renderable media stream.

In the embodiment shown, the method 100 starts with the rendering of a media stream, which may be of any type as described above to a user in an initiate rendering operation 102. Concurrent with the rendering of the media stream, a displaying content operation 104 displays at least some of the text to be associated with different portions of the media stream to the user in a graphical user interface (GUI) for the system. As discussed above, both the media stream and the text may have been previously selected by the user prior to initiating the method 100. The media stream and the text may be rendered in one or more different display areas on the GUI or by a different display device or means. For example, the video of a media stream may be rendered in a first window (i.e., video display area) in a computer monitor, while the audio of the media stream is rendered using speakers or headphones and some portion of the text containing a transcript of the media stream may be displayed in a separate displayable content area (i.e., a text display area) on the same computer monitor. The text display area and the video display area may be separate windows or areas of a single window adjacent to each other in a graphical user interface (GUI) for the system, such as that GUI shown as shown in FIGS. 3 and 4.

As the media stream is being rendered to the user, the user can enter one or more user inputs through the GUI of the system. In the embodiment shown, the method 100 includes receiving a user input through the GUI in a receiving operation 106. The receiving operation 106 may take the form of detecting a mouse click or depression of a button on some other pointing device. Alternatively, a touch to a touch-sensitive screen may be detected, a voice command may be heard or some other system-recognizable action performed by the user may be registered by the system.

The user input is analyzed and it is determined that the input selects at least some of the text displayed in the text display area in a selection operation 108. More detail is provided below with reference to FIGS. 5A and 5B concerning examples of how different user inputs may be resolved to determine the selection of different amounts of text. In any case, the selection operation 108 determines some portion of text displayed to the user in the text display area. The selection operation 108 may include highlighting or otherwise altering the display of the text in the display area to indicate to the user what the system has selected in response to the user's input.

The method 100 also includes an identification operation 110 that identifies at least the point at which the user input was received, and using this information determines approximately the point in the media stream that was being rendered when the user input was received. This point is used to identify a starting point for the portion of the media stream that will be associated with the text selected by the user input. In the high-level embodiment shown, the identification operation 110 also includes identified an end point of the portion of the media stream that will be associated with the text selected by the user input. As discussed in greater detail below, the end point may be determined by the same user input that selects the text to be associated with the portion or may be determined by the next-received user input that selects other text to be associated with a next portion of the media stream.

The method 100 further includes an association operation 112 that associates the text selected by the user input with the portion of the media stream identified by the identification operation 110. As described above, various computing methodologies exist or have been proposed for tagging media streams with metadata. The association operation 112 may use one or more of any suitable methods to associated the selected text (or other content associated with the displayable content selected) with the identified portion of the media stream. For example, the system may interact with a time tagging application programming interface to generate metadata for storage with a tagged copy of the media stream. The metadata may include an identification of the starting point of the portion, the duration or end point of the portion, and the text or other content to be associated with the portion of the media stream. A suitable media stream player may then be capable of rendering the tagged copy and interpreting the metadata so as to display the selected text when the associated portion of the media stream is being rendered (played) by the player. Other methods of tagging the media stream are also possible, the details of which are unimportant to this specification. Regardless of the exact methodology used to associate the selected text with the identified portion, the system through the GUI is adapted to generate the necessary information and perform the necessary functions under the methodology in response to the user's inputs.

The method 100 further includes revising the text display area in response to the association of the selected text with a portion of the media file in a revise display operation 114. The revise display operation 114 may include scrolling text though the text display area so that the user can see additional text that has not yet been associated with the media stream. In addition, the operation 114 may also visually indicate to the user what text has been associated based on the user's previous inputs by changing how the newly associated text is displayed. For example, in response to a selection of less than a full row of text the system can optionally split and move the remaining text on that row to a new row to help selecting the remaining text. After the display area has been revised, the method 100 returns to the display operation 104 and a waiting state in which it waits for the next user input.

The method 100, although presented in the context of associated previously generated text with a media stream, allows the easy selection and association of any displayable content with any media stream.

In addition, the method 100 could also be used to revise the metadata of a previously tagged media stream. In this application, the method 100 would display the renderable media stream and the text from the previously generated metadata and illustrate each set of selected text as each associated portion of the media stream is rendered. Through the interface, any user inputs "overwrite" any existing associations and allow the user to easily revise, change and hone the associations and the starting and ending points of the portions. When used for these revisions, the method 100 would operate essentially as described above except that the displayable content would be obtained from the metadata of the media stream and the display operation 104 would display the displayable so as to identify the displayable content currently associated with the portion of the media stream currently being rendered.

Figure 2:
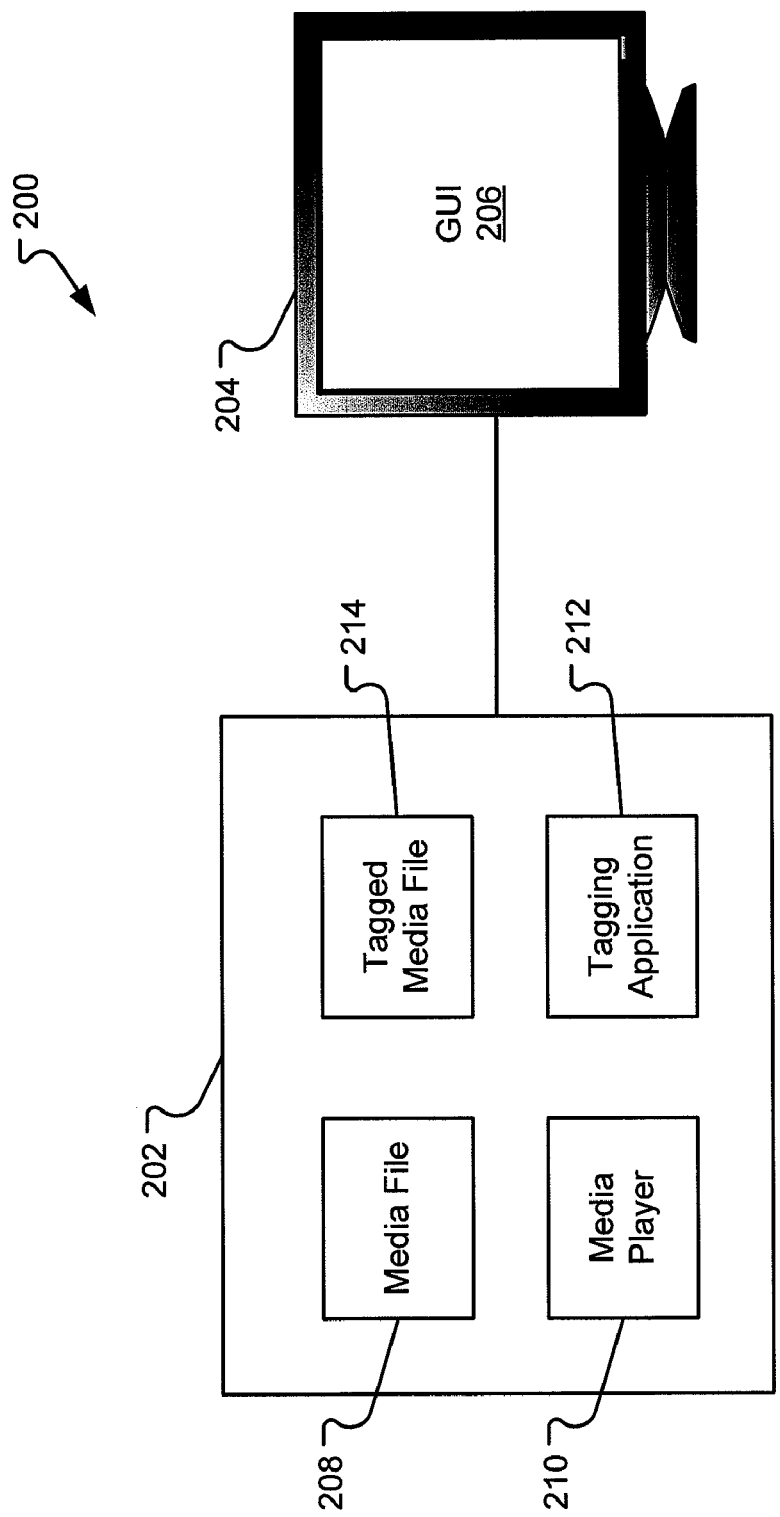
FIG. 2 illustrates an embodiment of a computing architecture for a system for associating displayable content with renderable media stream.

FIG. 2 illustrates an embodiment of a computing architecture for a system for associating displayable content with renderable media stream. The architecture 200 includes a computing device 202 connected to a display device 204 such as a liquid crystal or cathode ray tube monitor, touch-screen, or any other display device now known or later developed.

In the embodiment shown, the functions of any of the various elements of the architecture could be distributed so that each element may be associated with a separate computing device. Computing devices generally include a processor and memory for storing data and software as well as means for communicating with other computing devices, e.g., a network interface module. Computing devices may be provided with operating systems and may be adapted to execute software applications in order to manipulate data and communicate with other systems. Alternatively, some or all of the various elements could be combined on a single computing device and performed by one or more software applications that perform the functions described elsewhere herein. Examples of computing devices include personal computers, smart phones, personal data assistants, servers and mainframes. One skilled in the art will recognize that although referred to in the singular, a computing device may actually consist of a plurality of computing devices that operate together to provide data in response to requests from other computing devices.

In a computing device, local files, such as media files or raw data stored in a datastore, may be stored on a mass storage device (not shown) that is connected to or part of any of the computing device. A mass storage device and its associated computer-readable media, provide non-volatile storage for the computing device. Although the description of computer-readable media contained herein refers to a mass storage device, such as a hard disk or CD-ROM drive, it should be appreciated by those skilled in the art that computer-readable media can be any available media that can be accessed by the computing device.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

In an embodiment, the computing device 202 in the architecture is single computing device such as a personal computer, smart phone, laptop computer, etc., connected to the display device 204 which may be and integral part of the computing device 202 or a separate device as shown. In an alternative embodiment, one or more of the elements described in FIG. 2 may be maintained on a remote server computer (not shown). For example, the display device 204 may be attached to a client computer (not shown) provided with a browser that allows the client computer to access the computing device 202.

The architecture 200 includes at least one renderable media stream 208, illustrated in the embodiment shown as a media file 208. The media file 208 is the source of the renderable media stream data and is of a form that can be accessed and rendered by the media player 210. In the embodiment shown the media player 210 is illustrated as a separate program, examples of which include Windows Media Player, Yahoo! Music Jukebox and Real Player to name but a few. Alternatively, the media player 210 could be included as an integral part of the tagging application 212.

In the embodiment shown, the tagging application 212 generates the GUI 206 for the system. The GUI 206 renders the media stream and displays the displayable content to the user and also receives the user inputs. Based on the inputs received and the portion of the media stream that is being rendered when the user inputs are received, the tagging application 212 generates the appropriate metadata or otherwise interacts with the media player 210 and other components of the computing device as necessary to complete the association. Depending on the tagging methodology used, the output of the tagging application 212 may differ in order to effect the association. In the embodiment shown, the tagging application 212 is adapted to interface with the computing device 202 and media player 210 to generate a tagged media file 214 that includes the metadata generated by the tagging application 212. Depending on the tagging methodology used, a tagged media file 214 may, or may not, ultimately be generated.

FIG. 3 illustrates an embodiment of a graphical user interface for a system for associating displayable content with renderable media stream. In the embodiment shown, the GUI 300 is contained within a window 302. The GUI 300 includes a first area 304 for rendering the media stream in. The media stream rendering area 304 displays the media stream during rendering to the user so the user can watch the rendering of the media stream.

Adjacent to the media stream display area 304, a second display area 306 for displaying the text or other displayable content to be associated with the rendering media stream. The second display area 306 is illustrated as containing multiple rows of text 308. As discussed above, other elements could be displayed in the second display area 306 in addition to text.

FIG. 3 also illustrates a visual selector 310, in the form of a pen 310. The selector 310 may be a virtual selector such as a pen, arrow or cursor drawn on the GUI in response to the movement of a pointing device such as a mouse, trackball, touchpad or other interface between the user and the computing device. Alternatively, if the display device includes a touch-sensitive screen, the selector 310 may be an actual physical device such as a stylus, pen, laser-pointer, finger or any other device whose touch is detectable by the touch-sensitive screen.

In the embodiment shown, one method of selection of text 308 is illustrated. In the FIG. 3, the user has "tapped" (i.e., issued a user input that is received by the system) a location on the second, in this case text, display area 306. The tapping may take the form of a physical tap or the form of a mouse click while the selector 310 is located within the text display area 306. The location tapped is determined by the system and resolved to identify what elements in the text display window 306 should be selected in response to the tap.

In the embodiment shown, the user has tapped a point to the left of a row 312 of text. In response, the system resolves this as a selection of the entire row 312 and revises the display to highlight the selected row as shown.

In the system, different locations within the text display area are resolved to different selections. In an embodiment, user inputs that underline a word, or portion of a word, are resolved to select that word or portion of word. In addition, as described below, the tap may also specify the beginning and end times for a portion of the media stream for the selected text depending on the duration of the tap. For example, the time the tap is first detected relative to the rendering media stream may be used to generate the start of the portion and the removal of the touch or release of the button on the pointing device may be used to determine the end of the portion and, possibly the beginning of the next portion.

In an embodiment, a tap in front of a text row (or on an image if the metadata is an image and not text) may be resolved to specify the beginning time only for the whole row of text (see FIG. 3). In an embodiment, a short tap on or under a word may be resolved to select the word and the beginning time for the word. In an embodiment, a user input that draws a vertical line in the margin may select the beginning time for one or more rows. In an embodiment, when selecting a row or multiple rows (2, 3 and 4) a vertical line can be drawn between words or letters to specify the end time at that point in the text and time.

As discussed above, in response to a selection the system can optionally split and move the remaining text on that line to a new line to help selecting the remaining text. The system also can optionally determine the end time for the previous tagged piece of information when the next portion is tagged, that is tapping a row only sets the beginning time for that row, but when the next row is tapped the end time is specified for the previous row in addition to the beginning time of the new row. Identification of the start time and end time of a portion of the media stream is discussed in greater detail with reference to FIGS. 5A and 5B.

FIG. 4 illustrates another embodiment of a graphical user interface for a system for associating displayable content with renderable media stream. In the GUI 400, a user input is received that indicates the user has underlined a word 316. In response to the underlining, the GUI 400 highlights the underlined word as well as displaying the underline. In addition, as discussed elsewhere, the starting time of the underlining and ending time of the user input may be used to determine the extent of the portion of the media stream to which to associate the underlined text with.

Figure 5A:
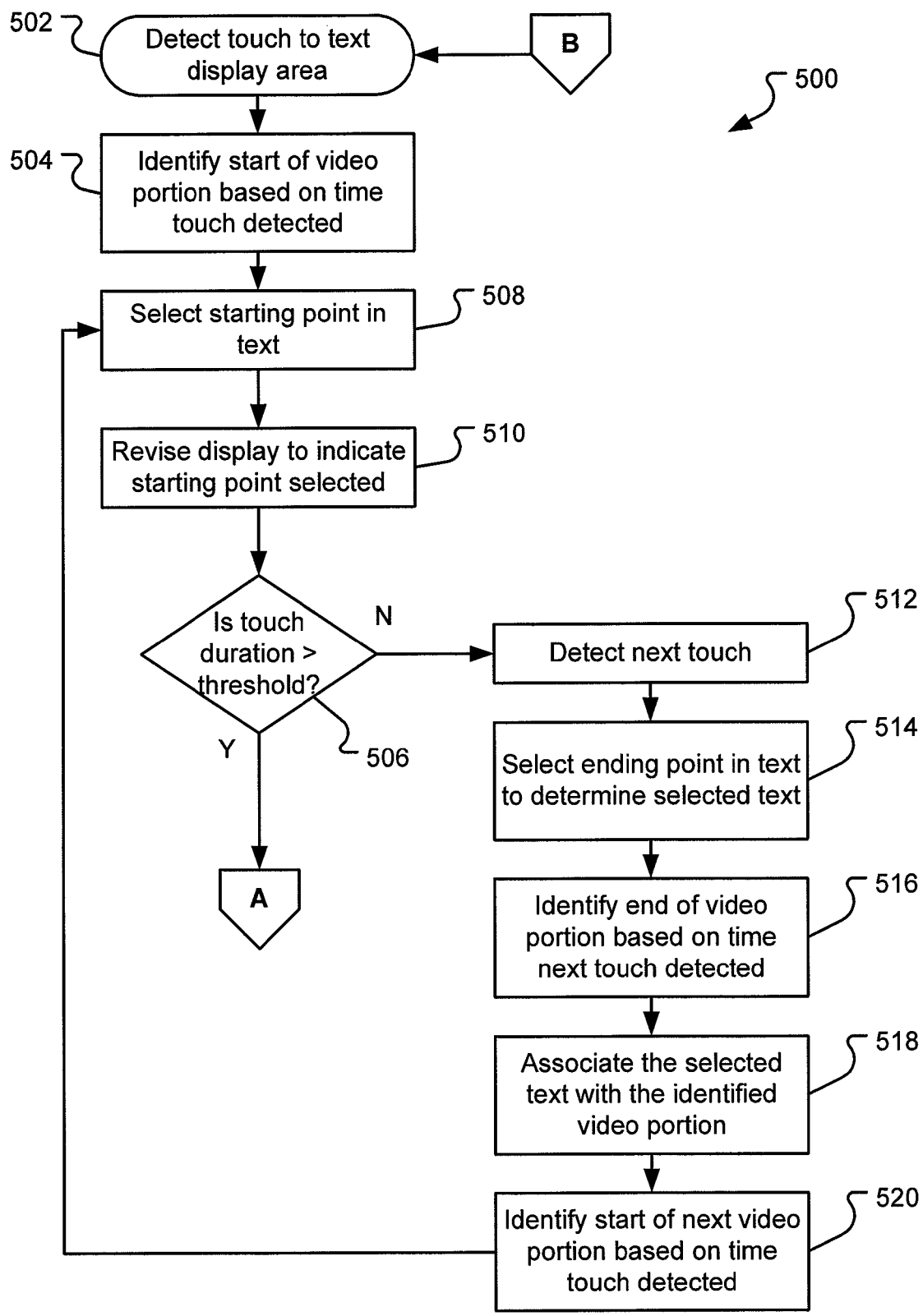
FIGS. 5A and 5B illustrate another embodiment of a method for associating displayable content with renderable media stream.

FIG. 5A illustrates another embodiment of a method for associating displayable content with renderable media stream. In the embodiment shown, the method 500 will be described in terms of a touch-sensitive display receiving user inputs in the form of touches to the display. The reader will understand that other user inputs and displays may be substituted as already described. The method 500 is also described from the point where a media stream is already being rendered in the media display area of the GUI and the text is being displayed in the text display area.

The method 500 starts with the detection of a touch to the touch-sensitive display in a detect touch operation 502. In response, the system identifies a starting point in the rendering media stream based on the time the touch was detected in a start point identification operation 504. The start point identified may be the exact frame or content being displayed when the touch is detected or may be some approximation, such as the nearest or next I-frame of an MPEG stream.

In addition, based on the location of the touch detected in the detection operation 502, a starting point in the text is identified. As discussed above, the location may be resolved to a row of text, an individual word in the text, or even a portion of a word.

The text display is then revised to illustrate to the user what selection has been made based on the user input received in a revise display operation 510. As discussed above, this may include highlighting the selection and/or drawing a line or point on the GUI.

A determination operation 506 may be performed to determine if the touch is a quick tap or a long touch. In an embodiment, this is done by tracking how long the touch is detected for and comparing it to a predetermined threshold, that may have been user dictated. If the touch is longer in duration than the threshold, then the method continues on FIG. 5B with a second determination operation 522, discussed below.

If the touch is less than the threshold, then the text selected in the selection operation 510 is considered a starting point in the text for the content to be associated with the portion of the video stream. Neither the end point of the text nor the end point of the portion is known at this time. However, upon detection of a next touch (in a detect next touch operation 512), this information can be determined by the method 500.

After the next touch is detected in the detect next touch operation 512, an ending point selection operation 514 is performed that selects the end point of the text displayed in the text display area. The operation 514 identifies the location of the touch and resolves the location to a point in the text in the text display area. The location is used as the end point of the selection of text to be associated with the portion of the rendering media stream. In an embodiment, the selected text is the text between the start point identified in the first selection operation 508 and the end point identified in the second selection operation 514.

In addition, the method 500 includes identifying the end of the portion of the media stream in an end point identification operation 516. The operation 516 uses the time the next touch is received and the media being concurrently rendered to identify the end of the portion of the media stream.

An association operation 518 is then performed to associate the selected text (i.e., the text between the first touch and the second touch) with the portion of the media stream defined by what was being rendered when the first touch and second touch were detected. As discussed above, the information generated and how that information is associated with the media stream will depend on the tagging methodology used. For example, the system may generate metadata including the selected text and the identified portion of the media stream. This metadata may then be transmitted to the media player or some other program through a tagging application programming interface exposed by the media player. The program then may create a new version of the media stream with the metadata included so that, when rendered by a compatible player, the selected text is displayed when the identified portion is rendered. In addition to text and portion information, other information may also be generated such as where and how the text is to be formatted and displayed later rendering of the tagged media stream.

In the embodiment shown, the second touch detected in the next touch detection operation 512 is treated as the start point for the next portion of the media stream. This is illustrated on the flow chart by an identify next portion operation 520.

Figure 5B:
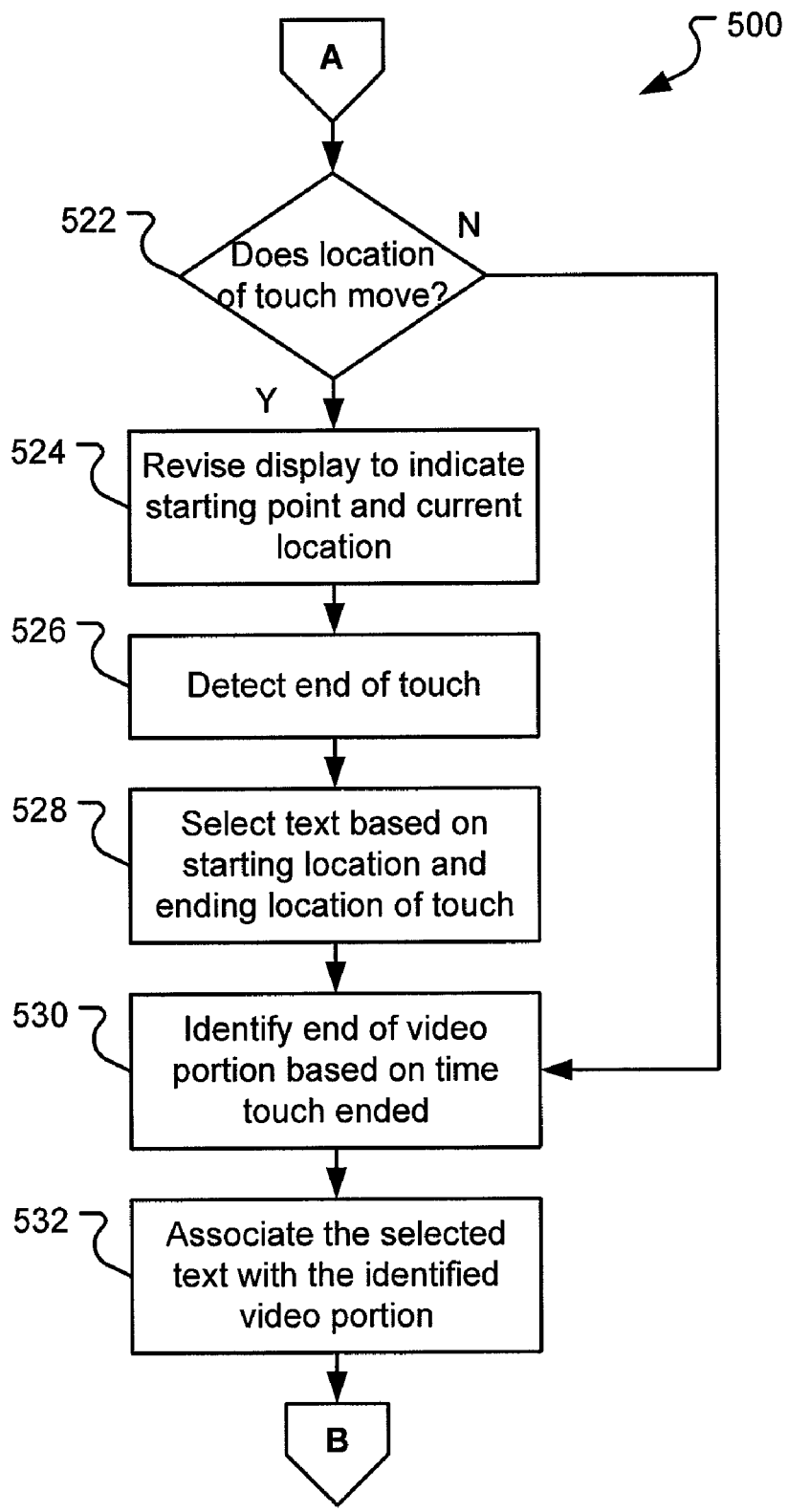

Turning now to the operations illustrated in FIG. 5B, if the determination operation 506 determines that the touch is detected for longer than the threshold then, in the embodiment shown, a second determination operation 522 monitors the touch location to determine if the touch moves significantly within the duration of the touch. If the touch does not move, then the time when the touch ceases is used to determine the end point of the portion of the rendered media stream. To effect this, flow jumps to another identify end point operation 530 discussed below. For example, if a user touched a location on the touch-sensitive display that indicates a row, the user could maintain the touch until the user no longer wanted the row to be displayed on the tagged media stream. The second determination operation 522 would detect no significant movement in location of the touch and flow would transfer to the identify end point operation 530. This ultimately causes the text selected in the starting point operation 508 to be associated with the portion defined based on when the touch was first detected until it was no longer detected.

If the second determination operation 522 determines that the touch moves within the text display area, the display is again revised in another revise display operation 524 to indicate the currently selected text (i.e., the text between the initial location detected in the initial detection operation 502 and whatever location the touch moves to in the display area. This operation 524 may be an ongoing operation so the as the touch is moved the display is constantly revised.

When the user removes the touching device from the display, a detect end of touch operation 526 occurs. The extent of text is then selected for association with the portion of the media stream in a text selection operation 528 based on the start location of the touch and the end location of the touch.

Detection of the end of the touch also causes the identify end point operation 530 to be performed. The identify end point operation 530 identifies the end of the portion of the media stream based on what was being rendered when the touch ceased.

An association operation 530 is then performed to associate the selected text with the identified portion of the media stream and the appropriate data is generated and transmitted as described elsewhere. In the embodiment shown, after the association operation 530 the system returns to a waiting mode to wait for the next touch to be detected, as illustrated by the flow returning to the detection operation 502 on FIG. 5A.

One skilled in the art will recognize that many variations in the order or redistribution of the functions of operations may be possible that still achieve the same results. For example, in an alternative embodiment, detection of the end of a long touch may also be used to determine a starting point for a next portion of the media stream as discussed in identify next portion start operation 520. As another example, one or more of the selection and identification operations may generate and transfer some information regarding the portion and text in addition to or instead of the association operations. Such embodiments all achieve the same result and are considered within the scope of the present disclosure.

Those skilled in the art will recognize that the methods and systems of the present disclosure may be implemented in many manners and as such are not to be limited by the foregoing exemplary embodiments and examples. In other words, functional elements being performed by a single or multiple components, in various combinations of hardware and software or firmware, and individual functions, can be distributed among software applications at either the client or server level or both. In this regard, any number of the features of the different embodiments described herein may be combined into single or multiple embodiments, and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, and those variations and modifications that may be made to the hardware or software or firmware components described herein as would be understood by those skilled in the art now and hereafter.

While various embodiments have been described for purposes of this disclosure, various changes and modifications may be made which are well within the scope of the present invention. For example, the systems and methods described above could be used to associate text as it is generated by a typist with a media stream. The interface would also allow the typist to easily revise the initial association by replaying the media stream with its associated text and adjusting the associations using the methods described above.

Numerous other changes may be made which will readily suggest themselves to those skilled in the art and which are encompassed in the spirit of the invention disclosed and as defined in the appended claims.

What is claimed is:

1. A method comprising:
rendering, via a computing device, a video stream in a video display area, the video display area being displayed in a display associated with the computing device;
simultaneously displaying one or more text elements in a touch-sensitive text display area in the display of the computing device;
detecting, via the computing device, a first touch at a first location on the touch-sensitive text display area as a portion of the video stream is being rendered;
selecting, via the computing device, at least one text element in the text display area based on the first location of the touch; and
associating, via the computing device in response to the touch, the selected at least one text element with the portion of the video stream.

2. The method of claim 1 further comprising:
defining a start of the portion of the video stream based on when the first touch is initially detected.

3. The method of claim 2 further comprising:
if the first touch is still detected after a predetermined period of time, defining an end of the portion of the video stream based on when the first touch is no longer detected.

4. The method of claim 2 further comprising:
if the first touch is detected for less than the predetermined period of time, defining the end of the portion of the video stream upon detection of a second touch.

5. The method of claim 2 further comprising:
if the first location corresponds to a single text element and if the first touch is detected for less than the predetermined period of time, selecting the single text element.

6. The method of claim 5 wherein the single text element is a word and the first location is selected from an area below the word and an area displaying the word.

7. The method of claim 5 wherein the single text element is a first row of text and the first location is selected from left of the first row and right of the first row.

8. The method of claim 1 wherein selecting further comprises:
detecting a change of the first touch from the first location to a second location on the touch-sensitive text display area; and
selecting the at least one text element in the text display area based on the first location and the second location.

9. The method of claim 8 further comprising:
redisplaying the one or more text elements in the touch-sensitive text display area based on the second location.

10. The method of claim 8 wherein the first location is selected from left of the first row and the second location is left of a second row of text below the first row.

11. A method comprising:
rendering, via a computing device, a media stream to a user;
simultaneously displaying one or more text elements to the user in a text display area displayed on a display associated with the computing device;
receiving, via the computing device, a user input as a portion of the media stream is being rendered, the user input selecting at least one text element in the text display area; and
associating, via the computing device in response to the user input, the selected at least one text element with the portion of the media stream.

12. The method of claim 11 wherein associating further comprises:
storing metadata associated with the media stream, the metadata based on the user input and the selected at least one text element, the metadata interpretable by a rendering device to cause the selected at least one text element to be displayed when the portion of the media stream is rendered.

13. The method of claim 12 further comprising:
upon receipt of the start input, generating a start location of the portion of the media stream.

14. The method of claim 12 further comprising:
upon receipt of the end input, generating an end location of the portion of the media stream.

15. The method of claim 12 wherein the start input is generated by a first interaction with a pointing device received during the rendering of the media stream, the start input defining the start location of the portion of the media stream.

16. The method of claim 12 wherein the end input is generated by a second interaction with a pointing device, the interaction with a pointing device defining the end location of the portion of the media stream.

17. The method of claim 12 wherein the end input is also a subsequent start input for a subsequent portion of the media stream and the end input further selects a different at least one text element.

18. The method of claim 12 wherein the start input is generated by a command from the user to begin selection of the at least one text element in the display area.

19. The method of claim 18 wherein the end input is generated by a command from the user to end selection of the at least one text element in the display area.

20. The method of claim 11 wherein the user input includes a start input, a selection input, and an end input.

21. The method of claim 11 wherein the user input is generated via depression of a button on a pointing device, movement of the pointing device controlling movement of a selector over the text display area, and a release of the button.

22. The method of claim 11 wherein the text display area is a touch-sensitive display and receiving the user input comprises:
detecting a touch to the touch-sensitive text display area.

23. The method of claim 22 wherein receiving further comprises:
identifying a location of the touch; and
determining that the at least one text element in the text display area is associated with the location.

24. A computing device for visibly displaying a graphical user interface on a display screen of the computing device, the graphical user interface comprising:
a first media display area rendering a selected media stream over time, the first media display area being visibly displayed on the display of the computing device;
a second media display area rendering one or more data elements to be associated with different portions of the media stream, the second media display area being visibly displayed on the display of the computing device; and
a user-controlled selector allowing a user to select and associate at least one data element in the second display area with a currently displayed portion of the selected media stream in the first media display area.

25. The graphical user interface of claim 24 wherein the second media display area is adjacent to the first media display area.

26. The graphical user interface of claim 24 wherein as each at least one data element is selected in the second media display area, the one or more data elements displayed in the second media display area are changed so that data elements that have not been selected are visible in the second media display area.

27. The graphical user interface of claim 24 further comprising:
a video playback control panel comprising one or more user interface elements controlling the rendering of the selected media stream in the first media display area.

28. The graphical user interface of claim 24 wherein as the first media display area renders a first portion of the selected media stream, the second media display area displays data elements previously associated with the first portion of the selected media stream.

29. The graphical user interface of claim 24 wherein the user may change the data elements previously associated with the first portion of the selected media stream via the user-controlled selector.

30. The graphical user interface of claim 24 wherein the second media display area is a touch-sensitive display.

31. The graphical user interface of claim 24 wherein the user-controlled selector is a touching apparatus detectable by the touch-sensitive display.

32. The graphical user interface of claim 24 wherein the user-controlled selector is a stylus.

33. A computer-readable storage medium for tangibly storing thereon computer-executable instructions for performing, when executed, a method comprising:
rendering a video stream to a user;
simultaneously displaying one or more displayable elements to the user in a display area;
receiving a user input as a portion of the video stream is being rendered, the user input selecting at least one displayable element in the display area; and
associating, in response to the user input, the selected at least one displayable element with the portion of the video stream.

34. The computer-readable storage medium of claim 33 wherein associating further comprises:
storing metadata associated with the video stream, the metadata based on the user input and the selected at least one displayable element, the metadata interpretable by a rendering device to cause the selected at least one displayable element to be displayed when the portion of the video stream is rendered.

35. The computer-readable storage medium of claim 33 wherein the user input includes a start input, a selection input, and an end input.

36. The computer-readable storage medium of claim 35 further comprising instructions for:
upon receipt of the start input, generating a start location of the portion of the video stream.

37. The computer-readable storage medium of claim 35 further comprising instructions for:
upon receipt of the end input, generating an end location of the portion of the video stream.

38. The computer-readable storage medium of claim 35 wherein the start input is generated by a first interaction with a pointing device received during the rendering of the video stream, the start input defining the start location of the portion of the video stream.

39. The computer-readable storage medium of claim 35 wherein the end input is generated by a second interaction with a pointing device, the interaction with a pointing device defining the end location of the portion of the video stream.

40. The computer-readable storage medium of claim 35 wherein the end input is also a subsequent start input for a subsequent portion of the video stream and the end input further selects a different at least one displayable element.

41. The computer-readable storage medium of claim 35 wherein the start input is generated by a command from the user to begin selection of the at least one displayable element in the display area.

42. The computer-readable storage medium of claim 41 wherein the end input is generated by a command from the user to end selection of the at least one displayable element in the display area.

43. The computer-readable storage medium of claim 41 wherein the user input is generated via depression of a button on a pointing device, movement of the pointing device controlling movement of a selector over the display area, and a release of the button.

44. The computer-readable storage medium of claim 41 wherein the display area is a touch-sensitive display and receiving the user input comprises:
detecting a touch to the touch-sensitive display area.

45. The computer-readable storage medium of claim 43 wherein receiving further comprises:
identifying a location of the touch; and
determining that the at least one displayable element in the display area is associated with the location.

46. The computer-readable storage medium of claim 33 wherein each displayable element is selected from one or more words, one or more lines of words, one or more images, and one or more icons representing audio data.

* * * * *